W. B. DOW.
ICE CREAM DISHER.
APPLICATION FILED MAR. 10, 1919.
1,323,582. Patented Dec. 2, 1919.
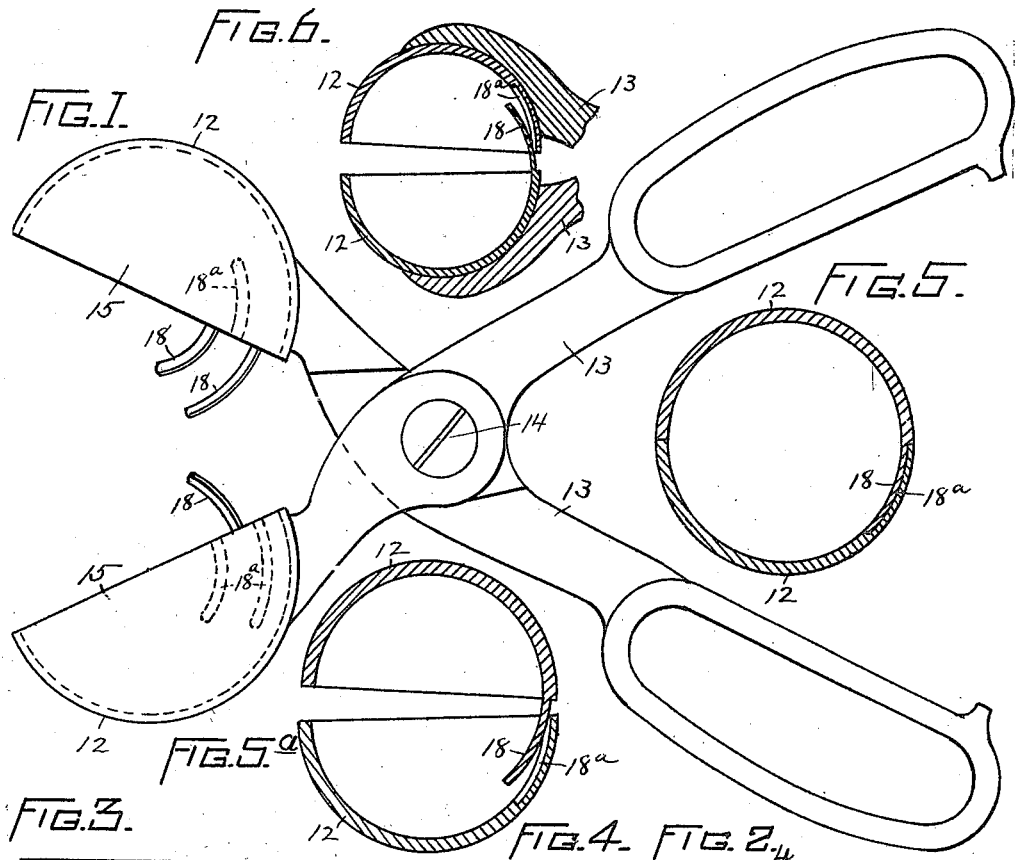
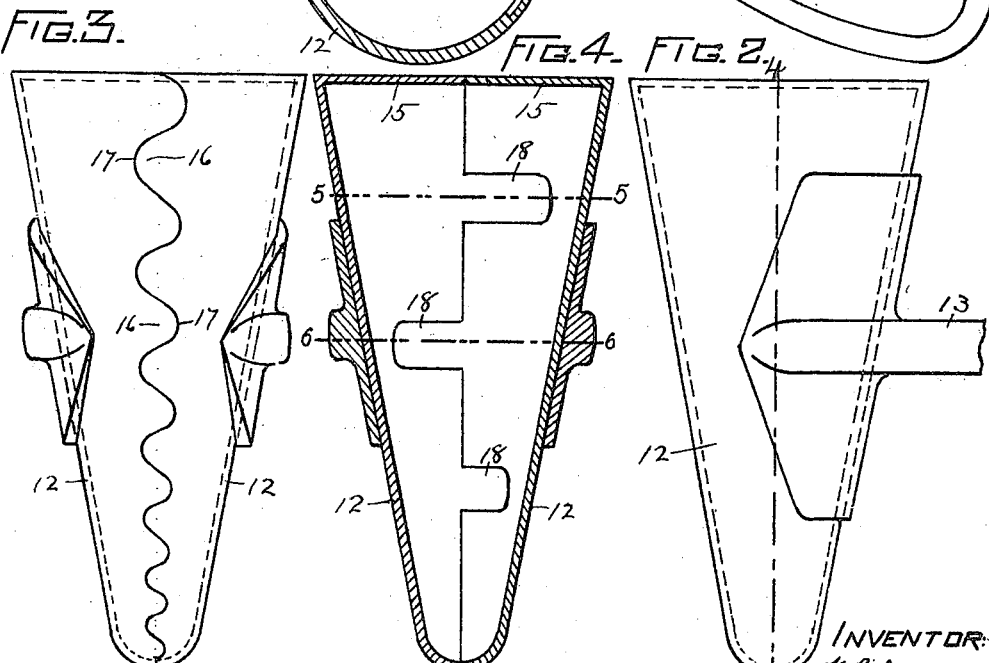

UNITED STATES PATENT OFFICE.

WILLIAM B. DOW, OF WALTHAM, MASSACHUSETTS.

ICE-CREAM DISHER.

1,323,582.     Specification of Letters Patent.     Patented Dec. 2, 1919.

Application filed March 10, 1919. Serial No. 281,695.

*To all whom it may concern:*

Be it known that I, WILLIAM B. Dow, a citizen of the United States, residing at Waltham, in the county of Middlesex and State of Massachusetts, have invented new and useful Improvements in Ice-Cream Dishers, of which the following is a specification.

This invention relates to an ice cream disher which includes a pair of mold sections and crossed levers pivoted together and attached to the sections, the levers being adapted to close the mold formed by said sections, and cause them to detach, from a mass of ice cream into which the device is forced, a portion for one individual, the sections being formed to impart a conical form to said portion.

One object of the invention is to provide improved means for preventing the formed body of ice cream from adhering to either of the mold sections when the mold is opened. Another object is to enable the mold sections to form a flat base end on a body or cone of cream, so that the cone when inverted and deposited on a plate will stand with its major axis perpendicular. Another object is to facilitate the movement of the outer edges of the mold sections through a mass of cream when the mold is being closed.

To these ends the invention consists in the improvements which I will now proceed to describe and claim.

Of the accompanying drawings forming a part of this specification,—

Figure 1 is a top plan view of an ice cream disher embodying the invention, the mold being open.

Fig. 2 is a side view, showing the mold closed, part of the crossed levers being omitted.

Fig. 3 is an end view.

Fig. 4 is a section on line 4—4 of Fig. 2.

Fig. 5 is a section on line 5—5 of Fig. 4.

Fig. 5ᵃ is a view similar to Fig. 5, showing the mold sections partly separated.

Fig. 6 is a section on line 6—6 of Fig. 4, the mold sections being partly separated.

The same reference characters indicate the same parts in all of the figures.

In the drawings, 12, 12 represent two mold sections collectively forming a hollow substantially conical sectional mold, the apex of the mold cavity being preferably semi-spherical instead of being pointed. 13, 13 represent crossed levers pivoted together at 14, and having longer and shorter arms, the shorter arms being attached in any suitable way to the mold sections 12, and the longer arms being formed as handles.

Each section 12 is closed at its larger end by a head section 15, the two head sections meeting when the mold is closed, as shown by Fig. 4.

The outer longitudinal edges of the sections 12, namely, those that are the farthest removed from the pivot 14, are preferably corrugated to form alternating teeth 16 and recesses 17 on each section, said corrugated edges matching when the mold is closed, as shown by Fig. 3.

When the mold is open, as shown by Fig. 1, the sections 12 are thrust into a mass of ice cream, and the mold is then closed to cause the formation of a cone-shaped portion of the cream by the mold sections. The corrugated edges of the sections facilitate the closing of the mold when the sections are embedded in a mass of cream. The head sections 15 impart a flat form to the base of the conical body formed by the mold, so that when the mold is inverted and opened, the base of the conical body of cream has a suitable bearing on a plate, causing the major axis of the body to stand perpendicular to the bottom of the plate.

Each section 12 is provided at its inner edge with an arcuate finger 18, which projects into the other section when the mold is closed, said fingers being adapted to prevent a body of ice cream formed by the mold from adhering to either section when the mold is opened. The arrangement of said fingers is such that when the mold is closed, the inner surfaces of the fingers are flush with the inner surfaces of the mold, as indicated by Fig. 5, each section being provided with a recess 18ᵃ, formed to receive a finger on the other section. Any suitable number of fingers may be employed. As here shown, one of the sections has two fingers, while the other section has one finger located between the other two fingers, as shown by Fig. 4.

It will be seen by reference to Figs. 5ᵃ and 6, that upon the commencement of the opening movement of the mold, the fingers 18 are caused to exert a displacing action on the cream contained therein, so that when the mold is opened sufficiently to release the formed portion of cream, the portion is detached from the mold sections and is prevented from clinging thereto.

I claim:

1. An ice cream disher comprising two mold sections collectively forming a hollow substantially conical sectional mold, and crossed levers pivoted together and attached to the mold sections, and adapted to open and close the mold, the inner edge of each section being provided with an arcuate finger projecting into the other section when the mold is closed, said fingers being adapted to prevent a body of ice cream formed by the mold from adhering to either section when the mold is opened.

2. An ice cream disher substantially as specified by claim 1, the inner surface of each section being provided with a recess formed to receive the finger projecting from the other section, the arrangement being such that when the mold is closed, the inner surface of each finger is flush with the inner surface of the section into which it projects.

3. An ice cream disher comprising two mold sections collectively forming a hollow substantially conical sectional mold, and crossed levers pivoted together and attached to the mold sections, and adapted to open and close the mold, each section being closed at its larger end by a head section, the head sections meeting when the mold is closed and imparting a flat form to the base of a conical body of ice cream formed by the mold.

4. An ice cream disher comprising two mold sections collectively forming a hollow substantially conical sectional mold, and crossed levers pivoted together and attached to the mold sections, and adapted to open and close the mold, the outer edges of said sections being corrugated to form alternating teeth and recesses, the teeth on one section fitting the recesses in the other section.

In testimony whereof I have affixed my signature.

WILLIAM B. DOW.